US00RE45796E

(19) United States
(12) Reissued Patent
Negley et al.

(10) Patent Number: US RE45,796 E
(45) Date of Reissued Patent: Nov. 10, 2015

(54) LIGHT EMITTING DIODE ARRAYS FOR DIRECT BACKLIGHTING OF LIQUID CRYSTAL DISPLAYS

(75) Inventors: Gerald H. Negley, Chapel Hill, NC (US); Antony P. van de Ven, Hong Kong (HK); Norbert Hiller, Chapel Hill, NC (US)

(73) Assignee: Cree, Inc., Durham, NC (US)

(21) Appl. No.: 13/169,359

(22) Filed: Jun. 27, 2011

Related U.S. Patent Documents

Reissue of:
(64) Patent No.: 7,322,732
Issued: Jan. 29, 2008
Appl. No.: 11/022,332
Filed: Dec. 23, 2004

U.S. Applications:
(63) Continuation of application No. 12/696,050, filed on Jan. 28, 2010, now Pat. No. Re. 42,598, which is an application for the reissue of Pat. No. 7,322,732.

(51) Int. Cl.
*F21V 7/04* (2006.01)
*G02F 1/1335* (2006.01)

(52) U.S. Cl.
CPC .... *G02F 1/133603* (2013.01); *G02F 1/133605* (2013.01); *G02F 2001/133628* (2013.01)

(58) Field of Classification Search
CPC ..... G02F 1/133603
USPC ..... 362/459–549, 97.1–97.4
See application file for complete search history.

(56) References Cited

U.S. PATENT DOCUMENTS 4,042,552 A 8/1977 Grucza
4,107,238 A 8/1978 Roper et al.
(Continued)

FOREIGN PATENT DOCUMENTS

EP 0 439 227 A1 7/1991
EP 1 045 458 A2 10/2000
(Continued)

OTHER PUBLICATIONS

Notification of Transmittal of the International Search Report and the Written Opinion of the International Searching Authority, or the Declaration, International Search Report, and Written Opinion of the International Searching Authority, PCT International Application No. PCT/US2004/017326, Jul. 14, 2005.
(Continued)

*Primary Examiner* — James Menefee
(74) *Attorney, Agent, or Firm* — Myers Bigel Sibley & Sajovec, P.A.

(57) ABSTRACT

A display panel for a flat panel display includes a planar array of LCD devices and a planar array of LED devices that is closely spaced apart from the planar array of LCD devices, at least some of the LED devices being disposed within a periphery of the array of LCD devices such that, in operation, the planar array of LED devices provides backlighting for the planar array of LCD devices. The planar array of LED devices can include at least one solid metal block having first and second opposing metal faces. The first metal face includes therein an array of reflector cavities, and the second metal face includes therein heat sink fins that are exposed at the back face of the flat panel display.

18 Claims, 4 Drawing Sheets

(56) References Cited

U.S. PATENT DOCUMENTS

| | | | | |
|---|---|---|---|---|
| 4,141,941 | A | 2/1979 | Travnicek | |
| 4,562,018 | A | 12/1985 | Neefe | |
| 4,650,922 | A | 3/1987 | McPherson | |
| 4,794,048 | A | 12/1988 | Oboodi et al. | |
| 4,826,424 | A | 5/1989 | Arai et al. | |
| 4,918,497 | A | 4/1990 | Edmond | |
| 4,935,665 | A | 6/1990 | Murata | |
| 4,966,862 | A | 10/1990 | Edmond | |
| 5,024,966 | A | 6/1991 | Dietrich et al. | |
| 5,027,168 | A | 6/1991 | Edmond | |
| 5,087,949 | A | 2/1992 | Haitz | |
| 5,110,278 | A | 5/1992 | Tait et al. | |
| 5,143,660 | A | 9/1992 | Hamilton et al. | |
| 5,166,815 | A | 11/1992 | Elderfield | |
| 5,210,051 | A | 5/1993 | Carter, Jr. | |
| 5,277,840 | A | 1/1994 | Osaka et al. | |
| 5,298,768 | A | 3/1994 | Okazaki et al. | |
| 5,338,944 | A | 8/1994 | Edmond et al. | |
| 5,374,668 | A | 12/1994 | Kanemura et al. | |
| 5,393,993 | A | 2/1995 | Edmond et al. | |
| 5,416,342 | A | 5/1995 | Edmond et al. | |
| 5,523,589 | A | 6/1996 | Edmond et al. | |
| 5,604,135 | A | 2/1997 | Edmond et al. | |
| 5,631,190 | A | 5/1997 | Negley | |
| 5,660,461 | A * | 8/1997 | Ignatius et al. | 362/241 |
| 5,669,486 | A | 9/1997 | Shima | |
| 5,739,554 | A | 4/1998 | Edmond et al. | |
| 5,753,730 | A | 5/1998 | Nagata et al. | |
| 5,813,753 | A | 9/1998 | Vriens et al. | |
| 5,851,063 | A | 12/1998 | Doughty et al. | |
| 5,857,767 | A | 1/1999 | Hochstein | |
| 5,858,278 | A | 1/1999 | Itoh et al. | |
| 5,882,553 | A | 3/1999 | Prophet et al. | |
| 5,912,477 | A | 6/1999 | Negley | |
| 5,959,316 | A | 9/1999 | Lowery | |
| 5,968,422 | A | 10/1999 | Kennedy | |
| 6,060,729 | A | 5/2000 | Suzuki et al. | |
| 6,066,861 | A | 5/2000 | Höhn et al. | |
| 6,069,440 | A | 5/2000 | Shimizu et al. | |
| 6,120,600 | A | 9/2000 | Edmond et al. | |
| 6,156,242 | A | 12/2000 | Saito et al. | |
| 6,177,688 | B1 | 1/2001 | Linthicum et al. | |
| 6,184,544 | B1 | 2/2001 | Toda et al. | |
| 6,187,606 | B1 | 2/2001 | Edmond et al. | |
| 6,201,262 | B1 | 3/2001 | Edmond et al. | |
| 6,219,223 | B1 | 4/2001 | Kobayashi et al. | |
| 6,252,254 | B1 | 6/2001 | Soules et al. | |
| 6,329,676 | B1 | 12/2001 | Takayama et al. | |
| 6,331,111 | B1 * | 12/2001 | Cao | 362/800 |
| 6,346,973 | B1 | 2/2002 | Shibamoto et al. | |
| 6,373,188 | B1 | 4/2002 | Johnson et al. | |
| 6,383,417 | B1 | 5/2002 | Paulson et al. | |
| 6,391,231 | B1 | 5/2002 | Evans et al. | |
| 6,404,125 | B1 | 6/2002 | Garbuzov et al. | |
| 6,480,389 | B1 | 11/2002 | Shie et al. | |
| 6,498,355 | B1 | 12/2002 | Harrah et al. | |
| 6,517,218 | B2 | 2/2003 | Hochstein | |
| 6,521,915 | B2 | 2/2003 | Odaki et al. | |
| 6,531,328 | B1 | 3/2003 | Chen | |
| 6,562,643 | B2 | 5/2003 | Chen | |
| 6,576,930 | B2 | 6/2003 | Reeh et al. | |
| 6,599,768 | B1 | 7/2003 | Chen | |
| 6,639,356 | B2 | 10/2003 | Chin | |
| 6,652,123 | B2 * | 11/2003 | Wu | 362/241 |
| 6,686,609 | B1 | 2/2004 | Sung | |
| 6,707,069 | B2 | 3/2004 | Song et al. | |
| 6,734,465 | B1 | 5/2004 | Taskar et al. | |
| 6,744,077 | B2 | 6/2004 | Trottier | |
| 6,783,362 | B2 | 8/2004 | Cao | |
| 6,789,921 | B1 * | 9/2004 | Deloy et al. | 362/252 |
| 6,791,151 | B2 | 9/2004 | Lin et al. | |
| 6,824,294 | B2 | 11/2004 | Cao | 362/231 |
| 6,853,131 | B2 | 2/2005 | Srivastava et al. | |
| 6,948,840 | B2 * | 9/2005 | Grenda et al. | 362/555 |
| 7,001,059 | B2 * | 2/2006 | Han et al. | 362/616 |
| 7,042,527 | B2 | 5/2006 | Imai | |
| 7,134,767 | B2 | 11/2006 | Liao et al. | |
| 7,355,562 | B2 * | 4/2008 | Schubert et al. | 345/1.3 |
| 2002/0006044 | A1 * | 1/2002 | Harbers et al. | 362/555 |
| 2002/0123164 | A1 | 9/2002 | Slater, Jr. et al. | |
| 2002/0172354 | A1 | 11/2002 | Nishi | |
| 2003/0006418 | A1 | 1/2003 | Emerson et al. | |
| 2003/0032212 | A1 | 2/2003 | Wang et al. | |
| 2003/0067264 | A1 | 4/2003 | Takekuma | |
| 2003/0080341 | A1 | 5/2003 | Sakano et al. | |
| 2003/0098459 | A1 | 5/2003 | Horiuchi et al. | |
| 2003/0128313 | A1 | 7/2003 | Kaminsky et al. | |
| 2003/0153861 | A1 | 8/2003 | Royer | |
| 2003/0173575 | A1 | 9/2003 | Eisert et al. | |
| 2003/0189829 | A1 | 10/2003 | Shimizu et al. | 362/240 |
| 2004/0041222 | A1 | 3/2004 | Loh | |
| 2004/0041757 | A1 | 3/2004 | Yang et al. | |
| 2004/0056260 | A1 | 3/2004 | Slater, Jr. et al. | |
| 2004/0065894 | A1 | 4/2004 | Hashimoto et al. | |
| 2004/0066556 | A1 | 4/2004 | Dontula et al. | |
| 2004/0079957 | A1 | 4/2004 | Andrews et al. | |
| 2004/0095738 | A1 | 5/2004 | Juang | |
| 2004/0120155 | A1 | 6/2004 | Suenaga | |
| 2004/0211970 | A1 | 10/2004 | Hayashimoto et al. | |
| 2004/0222433 | A1 | 11/2004 | Mazzochette et al. | |
| 2004/0253427 | A1 | 12/2004 | Yokogawa et al. | |
| 2004/0264212 | A1 | 12/2004 | Chung et al. | 362/561 |
| 2005/0007780 | A1 * | 1/2005 | Feuerborn et al. | 362/257 |
| 2005/0051782 | A1 | 3/2005 | Negley et al. | |
| 2005/0051789 | A1 | 3/2005 | Negley et al. | |
| 2006/0013014 | A1 * | 1/2006 | Hayman et al. | 362/572 |
| 2006/0018122 | A1 | 1/2006 | Negley | |
| 2006/0023448 | A1 * | 2/2006 | Mok et al. | 362/231 |
| 2006/0061259 | A1 | 3/2006 | Negley | |
| 2006/0063289 | A1 | 3/2006 | Negley et al. | |
| 2006/0087866 | A1 * | 4/2006 | Ng et al. | 362/612 |
| 2006/0097385 | A1 | 5/2006 | Negley | |
| 2006/0124953 | A1 * | 6/2006 | Negley et al. | 257/99 |
| 2006/0152651 | A1 | 7/2006 | Negley et al. | |
| 2010/0220472 | A1 * | 9/2010 | Dahm | 362/231 |

FOREIGN PATENT DOCUMENTS

| | | | |
|---|---|---|---|
| EP | 1 059 667 | A2 | 12/2000 |
| EP | 1 139 439 | A1 | 10/2001 |
| GB | 2 371 629 | A | 7/2002 |
| JP | 4-159519 | | 6/1992 |
| JP | 4-159519 | A | 6/1992 |
| JP | 5-152609 | A | 6/1993 |
| JP | 6-151974 | A | 5/1994 |
| JP | 6-177429 | A | 6/1994 |
| JP | 6-244458 | A | 9/1994 |
| JP | 08-116095 | | 5/1996 |
| JP | 8-116095 | A | 5/1996 |
| JP | 8-162676 | A | 6/1996 |
| JP | 9-083018 | A | 3/1997 |
| JP | 09-083018 | A | 3/1997 |
| JP | 9-146089 | A | 6/1997 |
| JP | 9-246603 | A | 9/1997 |
| JP | 10-098215 | A | 4/1998 |
| JP | 10-98215 | A | 4/1998 |
| JP | 10-242513 | A | 9/1998 |
| JP | 11-261114 | A | 9/1999 |
| JP | 11-298047 | A | 10/1999 |
| JP | 2000-101147 | A | 4/2000 |
| JP | 2000-174347 | A | 6/2000 |
| JP | 2000-183405 | A | 6/2000 |
| JP | 2000-286455 | A | 10/2000 |
| JP | 2000-286458 | A | 10/2000 |
| JP | 2001-077427 | A | 3/2001 |
| JP | 2001-77427 | A | 3/2001 |
| JP | 2001-77433 | A | 3/2001 |
| JP | 2001-077433 | A | 3/2001 |
| JP | 2001-144334 | A | 5/2001 |
| JP | 2001-230453 | A | 8/2001 |
| JP | 2002-118293 | A | 4/2002 |
| JP | 2002-158378 | A | 5/2002 |
| JP | 2002-223004 | A | 8/2002 |
| JP | 2002-280616 | A | 9/2002 |

(56) References Cited

FOREIGN PATENT DOCUMENTS

| | | | |
|---|---|---|---|
| JP | 2003-17755 | A | 1/2003 |
| JP | 2003-017755 | A | 1/2003 |
| JP | 2003-243718 | A | 8/2003 |
| JP | 2003-318448 | A | 11/2003 |
| WO | 97/24706 | A2 | 7/1997 |
| WO | 97/24706 | A3 | 7/1997 |
| WO | 01/43113 | A1 | 6/2001 |
| WO | 01/61764 | A1 | 8/2001 |
| WO | 02/059982 | A1 | 8/2002 |
| WO | 03/056876 | A2 | 7/2003 |
| WO | 03/056876 | A3 | 7/2003 |
| WO | 03/091771 | A1 | 11/2003 |

OTHER PUBLICATIONS

Aavid Thermalloy, LLC, *Extrusion Profiles,* retrieved Oct. 18, 2004 from http://www.aavidthermalloy.com/products/extrusion/index.shtml.

Andrews, *Methods for Packaging A Light Emitting Devices,* U.S. Appl. No. 60/557,924, filed Mar. 31, 2004.

Andrews, *Reflector Packages and Methods for Packaging of a Semiconductor Light Emitting Devices,* U.S. Appl. No. 60/558,314, filed Mar. 31, 2004.

Cabot Corporation, *Using Nanogel in Daylighting Systems,* retrieved Jan. 11, 2005 from http://w1.cabot-corp.com/Controller.jsp? . . . .

Craford, Overview of Device Issues in High-Brightness Light-Emitting Diodes, Chapter, *High Brightness Light Emitting Diodes: Semiconductors and Semimetals,* vol. 48, Stringfellow et al. ed., Academic Press, 1997, pp. 47-63.

Cree, Inc., *Cree Optoelectronics LED Product Line,* Publication CPR3AX, Rev. D, 2001-2002.

Heatron, *ELPOR® Product Information,* retrieved Oct. 6, 2004 from http://www.heatron.com.

Heatron, *Metal Core PCBs for LED Light Engines* (Product Brochure), retrieved from http://www.heatron.com.

International Search Report, PCT/US03/27912, Jan. 30, 2004.

IRC Advanced Film Division, *Insulated Aluminum Substrates* (Product Brochure) retrieved from http://www.irctt.com, copyright 2002.

IRC Advanced Film Division, *Thick Film Application Specific Capabilities* (Product Brochure), retrieved from http://www.irctt.com, copyright 2002.

Loh, *Power Surface Mount Light Emitting Die Package,* U.S. Appl. No. 10/446,532, filed May 27, 2003.

Morris, *IRC's Anotherm™ PC Boards Eliminate Heat for Automotive LED Applications,* Mar. 16, 2004 Press Release, retrieved Sep. 17, 2004 from http://www.irctt.com/pages/Anotherm_PressRelease.cfm.

Negley et al., *Methods of Coating Semiconductor Light Emitting Elements by Evaporating Solvent From a Suspension,* U.S. Appl. No. 10/946,587, filed Sep. 21, 2004.

Negley et al., *Solid Block Mounting Substrates for Semiconductor Light Emitting Devices and Oxidizing Methods for Fabricating Same,* U.S. Appl. No. 10/659,108, filed Sep. 9, 2003.

Negley et al., *Solid Colloidal Dispersions for Backlighting of Liquid Crystal Displays,* U.S. Appl. No. 11/034,240, filed Jan. 12, 2005.

Negley et al., *Transmissive Optical Elements Including Transparent Plastic Shell Having a Phosphor Dispersed Therein, and Methods of Fabricating Same,* U.S. Appl. No. 10/659,240, filed Sep. 9, 2003.

Negley, *Reflective Optical Elements for Semiconductor Light Emitting Devices,* U.S. Appl. No. 10/898,608, filed Jul. 23, 2004.

Negley, *Semiconductor Light Emitting Device Mounting Substrates and Packages Including Cavities and Cover Plates, and Methods of Packaging Same,* U.S. Appl. No. 11/011,748, filed Dec. 14, 2004.

Negley, *Semiconductor Light Emitting Devices Including Patternable Films Comprising Transparent Silicone and Phosphor, and Methods of Manufacturing Same,* U.S. Appl. No. 10/947,704, filed Sep. 23, 2004.

Negley, *Solid Metal Block Semiconductor Light Emitting Devices Mounting Substrates and Packages Including Cavities and Heat Sinks, and Methods of Packaging Same,* U.S. Appl. No. 10/972,910, filed Oct. 25, 2004.

Notification of Transmittal of The International Search Report and The Written Opinion of the International Searching Authority, or the Declaration, International Search Report and Written Opinion of the International Searching Authority, PCT/US2004/017325, Sep. 28, 2004.

Slater, Jr. et al., *Phosphor-Coated Light Emitting Diodes Including Tapered Sidewalls and Fabrication Methods Therefor,* U.S. Appl. No. 60/411,980, filed Sep. 19, 2002.

"Notification of Transmittal of The International Search Report and the Written Opinion of the International Searching Authority, or the Declaration", "Written Opinion of the International Searching Authority" and "International Search Report", PCT/2004/017326, Jul. 14, 2005.

Notification of Transmittal of the International Search Report and the Written Opinion of the International Searching Authority, or the Declaration, International Search Report, and Written Opinion of the INternational Searching Authority, PCT International Application No. PCT/US2006/000414, May 8, 2006.

Notification of Transmittal of the International Search Report and the Written Opinion of the International Searching Authority, or the Declaration, International Search Report, and Written Opinion of the International Searching Authority, PCT International Application No. PCT/US2005/023873, May 8, 2006.

Notification of Transmittal of the International Search Report and the Written Opinion of the International Searching Authority, or the Declaration, International Search Report, and Written Opinion of the International Searching Authority, PCT International Application No. PCT/US2005/044805, May 9, 2006.

Notification of Transmittal of the International Search Report and the Written Opinion of the International Searching Authority, or the Declaration, International Search Report, and Written Opinion of the International Searching Authority, PCT International Application No. PCT/US2006/002117, May 30, 2006.

Notification of Transmittal of the International Search Report and the Written Opinion of the International Searching Authority, or the Declaration, International Search Report, and Written Opinion of the International Searching Authority, PCT International Application No. PCT/US2005/043719, May 26, 2006.

* cited by examiner

LIGHT EMITTING DIODE ARRAYS FOR DIRECT BACKLIGHTING OF LIQUID CRYSTAL DISPLAYS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*CROSS-REFERENCE TO RELATED APPLICATION*

*This application claims priority under 35 U.S.C. Section 120 as a continuation reissue application of U.S. application Ser. No. 12/696,050, filed Jan. 28, 2010, now U.S. Reissue Pat. No. Re. 42,598, which is a reissue of U.S. application Ser. No. 11/022,332, filed Dec. 23, 2004, now U.S. Pat. No. 7,322,732. Each of these applications is assigned to the assignee of the present application, and the disclosures of each of the above referenced applications are hereby incorporated herein by reference in their entirety as if set forth fully herein.*

*MULTIPLE REISSUE APPLICATIONS*

*More than one reissue application has been filed for the reissue of U.S. Pat. No. 7,322,732. The reissue applications are U.S. application Ser. No. 12/696,050, now U.S. Reissue Pat. No. Re. 42,598, and the present U.S. application Ser. No. 13/169,359, filed Jun. 24, 2011. The present U.S. application Ser. No. 13/169,359, filed on Jun. 27, 2011 is a continuation reissue application of U.S. application Ser. No. 12/696,050, filed on Jan. 28, 2010, which is a reissue of U.S. Pat. No. 7,322,732.*

FIELD OF THE INVENTION

This invention relates to Liquid Crystal Display (LCD) devices, and more particularly, to backlighting of LCD devices.

BACKGROUND OF THE INVENTION

LCD devices are widely used in flat panel displays for monitors, televisions and/or other displays. As is well known to those having skill in the art, an LCD display generally includes a planar array of LCD devices that act as an array of optical shutters. Transmissive LCD displays employ backlighting using fluorescent tubes above, beside and sometimes behind the array of LCD devices. A diffusion panel behind the LCD devices can be used to redirect and scatter the light evenly to provide a more uniform display.

For example, it is known to use one or more fluorescent cold cathode tubes adjacent one or more edges of the planar array of LCD devices, and a light guide or light pipe that directs the light from the fluorescent cold cathode tubes, to illuminate the face of the planar array of LCD devices. Unfortunately, such edge lighting may be inefficient, with up to 50% or more of the light being lost.

It is also known to provide an array of fluorescent cold cathode tubes behind and facing the planar array of LCD devices. Unfortunately, an array of fluorescent cold cathode tubes may increase the thickness of the LCD display and/or increase the power consumption thereof. It also may be difficult to uniformly illuminate the planar array of LCD devices with the array of fluorescent cold cathode tubes.

Semiconductor light emitting devices, such as Light Emitting Diode (LED) devices, also may be used for edge illumination of a planar array of LCD devices. For example, U.S. patent application Ser. No. 10/898,608, filed Jul. 23, 2004, entitled Reflective Optical Elements for Semiconductor Light Emitting Devices, to coinventor Negley, and assigned to the assignee of the present invention, the disclosure of which is hereby incorporated herein by reference in its entirety as if set forth fully herein, describes side emission LEDs that may be used for large area LCD and/or television backlighting.

SUMMARY OF THE INVENTION

Some embodiments of the present invention provide a display panel for a flat panel display that includes a planar (i.e., a two dimensional) array of LCD devices and a planar array of LED devices that is closely spaced apart from the planar array of LCD devices, at least some of the LED devices being disposed within a periphery of the array of LCD devices such that, in operation, the planar array of LED devices provides backlighting for the planar array of LCD devices. In some embodiments, the planar arrays of LCD and LED devices are at least 17 inches in size along a diagonal thereof. In other embodiments, the planar array of LED devices is configured to emit light that appears as white light. In still other embodiments of the present invention, the LED devices in the planar array of LED devices are spaced sufficiently close to one another so as to provide uniform backlighting of the planar array of LCD devices.

In some embodiments, the planar array of LED devices is configured to transmit light from the planar array of LED devices through the planar array of LCD devices, along a light path that extends generally perpendicular to the planar arrays of LCD and LED devices. In other embodiments, the light path does not redirect the light to be parallel to the planar arrays of LCD and LED devices. In still other embodiments, a reflector-free light path is provided between the planar array of LED devices and the planar array of LCD devices. In yet other embodiments, the planar array of LED devices is configured to emit light generally parallel to the planar array of LCD devices. In these embodiments, an array of reflectors may be configured to redirect the light that is emitted generally parallel to the planar array of LCD devices along a light path that extends generally perpendicular to the planar arrays of LCD and LED devices.

In other embodiments, a planar optical film is located between the planar array of LCD devices and the planar array of LED devices, such that, in operation, the planar array of LED devices transmits light through the planar optical film and to the planar array of LCD devices. The planar optical film may include polarizers, scatterers and/or other optical elements.

In some embodiments of the invention, the planar array of LED devices includes at least one solid metal block having first and second opposing metal faces that extend parallel to the array of LCD devices. The first metal face is facing toward the array of LCD devices, and the second metal face is facing away from the array of LCD devices. The first metal face includes therein an array of reflector cavities, and the second metal face includes therein a plurality of heat sink fins. At least one LED device is mounted in a respective reflector cavity such that, in operation, the reflector cavity reflects light that is emitted by the at least one LED device that is mounted therein away from the reflector cavity. In some embodiments, the at least one LED device that is mounted in the respective reflector cavity is configured to emit light that appears as white light in operation. In other embodiments, the at least one LED device that is mounted in the respective reflector cavity consists of a red LED device, a blue LED device and two green LED devices. In some embodiments, the two green LED devices emit green light at different frequencies.

It will be understood that embodiments of the invention have been described above in connection with display panels for flat panel displays. However, other embodiments of the invention can provide an LED-based backlighting system for an LCD display, according to any of the embodiments that were described above. Moreover, still other embodiments of the invention can add other components such as a frame and/or electronics to provide a flat panel display. Analogous backlighting methods also may be provided.

Other embodiments of the present invention provide a flat panel display that includes a front face comprising a planar (i.e., two dimensional) array of LCD devices, and a back face comprising at least one solid metal block. The solid metal block includes first and second opposing metal faces that extend parallel to the array of LCD devices. The first metal face is facing toward the array of LCD devices, and the second metal face is facing away from the array of LCD devices. The first metal face includes therein an array of reflector cavities and the second metal face includes therein a plurality of heat sink fins that are exposed at the back face of the flat panel display. At least one LED device is mounted in a respective reflector cavity such that, in operation, the reflector cavity reflects light that is emitted by the at least one LED device that is mounted therein away from the reflector cavity.

In some embodiments, the solid metal block is a single solid metal block that is congruent to the planar array of LCD devices. In other embodiments, the at least one solid metal block includes a plurality of solid metal block tiles that are arranged in an array that is congruent to the planar array of LCD devices. In still other embodiments, the at least one solid metal block includes a plurality of solid metal block bars that are arranged [face-to-face] to be congruent to the planar array of LCD devices.

In still other embodiments, a frame is provided that is configured to surround the front and back faces of the flat panel displays. The planar array of LCD devices may be at least 17 inches diagonal, the LED devices may be configured to emit light that appears as white light, the at least one LED device can include a red LED, a blue LED and two green LEDs, and/or an electronics module may be provided that is supported by the frame and is configured to control the LCD and LED devices, according to any of the embodiments that were described above.

DETAILED DESCRIPTION

Figure 1:
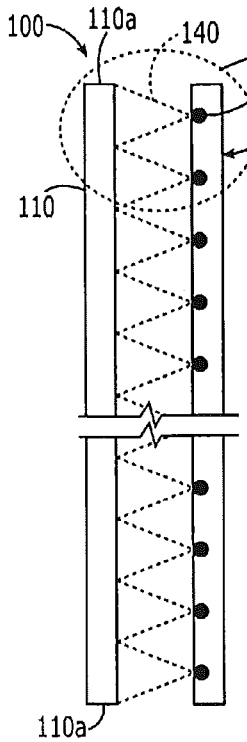
FIG. 1 is a cross-sectional view of display panels for flat panel displays according to various embodiments of the present invention.

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. In the drawings, the thickness of layers and regions are exaggerated for clarity. Like numbers refer to like elements throughout. As used herein the term "and/or" includes any and all combinations of one or more of the associated listed items and may be abbreviated as "/".

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, regions, steps, operations, elements, and/or components, but do not preclude the presence or addition of one or more other features, regions, steps, operations, elements, components, and/or groups thereof.

It will be understood that when an element such as a layer or region is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower", "base", or "horizontal", and "upper", "top", or "vertical" may be used herein to describe one element's relationship to another element as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompasses both an orientation of "lower" and "upper,"

depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Moreover, the terms "front" and "back" are used herein to describe opposing outward faces of a flat panel display. Conventionally, the viewing face is deemed the front, but the viewing face may also be deemed the back, depending on orientation.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated, typically, may be rounded. Thus, the regions illustrated in the figures are schematic in nature and their shapes are not intended to illustrate the precise shape of a region and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a cross-sectional view of display panels for flat panel displays according to various embodiments of the present invention. As shown in FIG. 1, these display panels 100 according to various embodiments of the present invention, include a planar (i.e., two dimensional) array 110 of LCD devices, and a planar array 120 of LED devices 130 that is closely spaced apart from the planar array 110 of LCD devices, at least some of the LED devices 130 being disposed within a periphery 110a of the array 110 of LCD devices such that, in operation, the planar array 120 of LED devices 130 provides backlighting for the planar array 110 of LCD devices.

Figure 2:
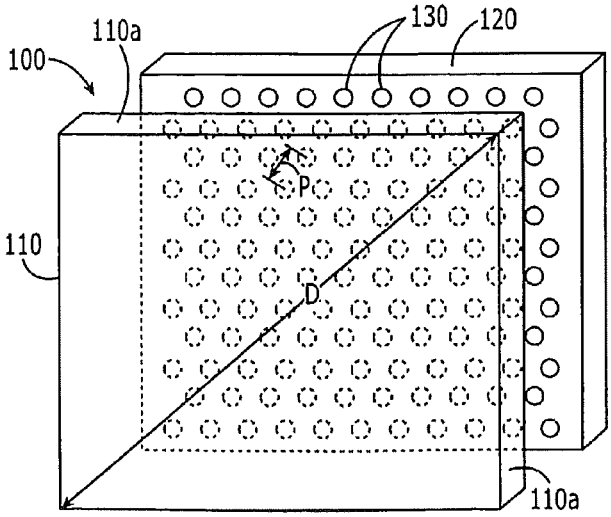
FIG. 2 is a perspective view of display panels for flat panel displays of FIG. 1.

FIG. 2 is a perspective view of flat panel displays of FIG. 1 according to various embodiments of the present invention. As shown in FIG. 2, the LED devices 130 in the planar array 120 may be spaced apart from one another so as to provide substantially uniform backlighting of the planar array of LCD devices 110. The LED devices 130 may be packed in a random array, a grid array, and/or using hexagonal packing, as shown in FIG. 2. Uniform and/or non-uniform packing may be provided.

Embodiments of the present invention may provide uniform backlighting for large area display panels. The display panels may be combined with other electrical and/or mechanical elements to provide computer monitors, televisions and/or other flat panel displays. As used herein, "uniform" backlighting means that an ordinary viewer, who views the display at a conventional viewing distance, is not aware of any variation in backlighting intensity. In some embodiments, variations of less than about 25% may provide uniform intensity, whereas, in other embodiments, variations of less than 5% may provide uniform intensity. In some embodiments, these displays are rectangular and, in some embodiments, may be square. As used herein, a large area display has a diagonal size D of at least 17". However, other embodiments of the invention may be used with displays that are smaller than 17" diagonal. Moreover, the pitch P between adjacent LED devices 130 in the array also may be arranged to allow a uniform backlighting of the planar array of LCD devices, according to some embodiments of the invention, as will be described in detail below.

Embodiments of the present invention that are described in FIGS. 1 and 2 can provide direct backlighting of flat panel liquid crystal displays. In particular, as shown in FIG. 1, the planar array 120 of LED devices 130 is configured to transmit light from the planar array 120 of LED devices 130 to the planar array 110 of LCD devices along a light path 140 that extend generally perpendicular to the planar arrays 110, 120 of LCD and LED devices. In some embodiments, the light path 140 does not redirect the light to be parallel to the planar arrays 110, 120 of LCD and LED devices. In other embodiments, the light path between the planar array 120 of LED devices 130 and the planar array 110 of LCD devices is reflector-free. In yet other embodiments, at least some of the LED devices 130 are disposed within a periphery of the array 110 of LCD devices.

By providing direct backlighting, the thickness of the display panel 100 may be reduced and/or the optical efficiency may be enhanced compared to edge backlighting. Moreover, in some embodiments, the need for diffusing and/or light guide elements between the planar array 110 of LCD devices and the planar array 120 of LED devices 130 also may be reduced or eliminated.

As was described above, in some embodiments of the present invention, the LED devices 130 in the planar array 120 of LED devices 130 are spaced sufficiently close to one another, so as to provide uniform backlighting of the planar array 110 of LCD devices. In particular, the light path 140 of FIG. 1 is illustrated by showing the half angle of illumination, i.e., the angle of illumination wherein the light output falls by one half the light output on the optical axis. By placing the LEDs sufficiently close so that the half angles of illumination just overlap, as shown in FIG. 1, uniform illumination of the array 110 of LCD devices may be provided, according to some embodiments of the present invention.

Figure 3:
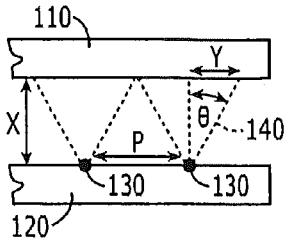
FIG. 3 is an enlarged view of a portion of a display panel for a flat panel display of FIG. 1.

FIG. 3 is an exploded view of a portion of the display panel for the flat panel display of FIG. 1, illustrating geometries that can provide uniform direct illumination according to various embodiments of the present invention. As shown in FIG. 3, the half angle of illumination is denoted by $\theta$, the spacing between the planar array 110 of LCD devices and the planar array 120 of LED devices 130 is denoted by x, and the pitch between adjacent LED devices 130 is 2y. It will be understood by those having skill in the art that smaller pitches than 2y may be used, but may not be needed to provide uniform illumination. Moreover, larger pitches may provide non-uniform illumination or may provide uniform illumination using diffusers and/or other optical elements in the light path.

Figure 4:
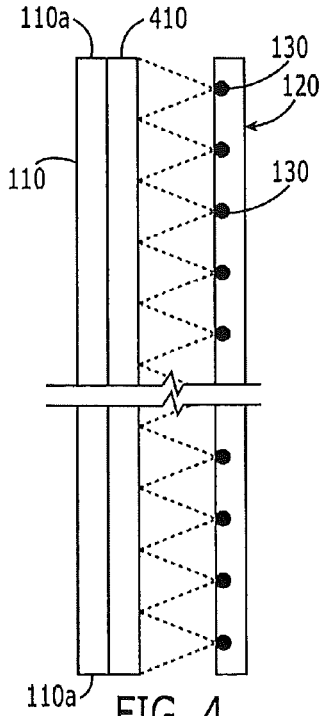
FIG. 4 is a cross-sectional view of display panels for flat panel displays according to other embodiments of the present invention.

As was described above, some embodiments of the present invention can eliminate the need for at least some optical films that are conventionally used in some flat panel displays. Conventionally, these optical films may include polarizers, light scattering films, light guide films, etc. In other embodiments of the invention, some of these optical films may be eliminated, but other optical films may still be used. For example, a polarizing film still may be used. Accordingly, as shown in FIG. 4, an optical film 410 may be placed between the array 110 of LCD devices and the array 120 of LED devices 130.

Figure 5:
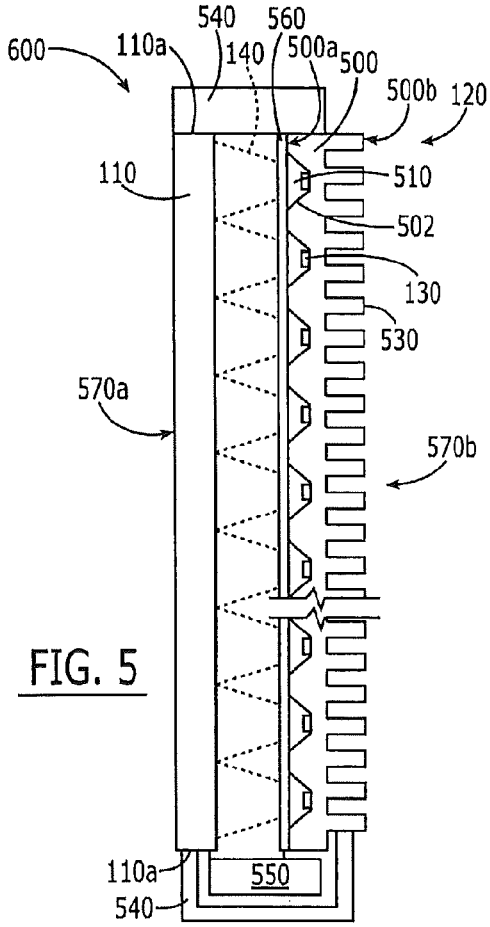
FIG. 5 is a cross-sectional view of flat panel displays according to still other embodiments of the present invention.

FIG. 5 is a cross-sectional view of flat panel displays 600 according to other embodiments of the present invention. In these embodiments, the planar array 120 of LED devices 130 includes at least one solid metal block 500 including first and second opposing metal faces 500a, 500b, respectively, that extend parallel to the array 110 of LCD devices. The first metal face 500a faces toward the array 110 of LCD devices, and the second metal face 500b faces away from the array 110 of LCD devices. The first metal face 500a includes therein an array of reflector cavities 510, and the second metal face 500b includes therein a plurality of heat sink fins 530. At least one LED device 130 is mounted in a respective reflector cavity 510 such that, in operation, the reflector cavity 510 reflects light that is emitted by the at least one LED device 130 that is mounted therein from the reflector cavity 510 along the optical path 140, as shown in FIG. 5.

In some embodiments, the reflector cavity 510 includes at least one sidewall 502 that is configured to reflect light that is emitted from the LED 130 in the cavity 510 along the optical path 140. Moreover, in some embodiments, a flexible film 1420 also may be provided that extends across one or more of the cavities 510. The flexible film 560 may include therein optical elements such as lenses, phosphor and/or other optical elements therein.

Many different embodiments of planar arrays 120 of LED devices 130 may be provided according to various embodiments of the present invention, as are described, for example, in U.S. Publication No. 2006/0097385, published May 11, 2006, entitled Solid Metal Block Semiconductor Light Emitting Device Mounting Substrates and Packages Including Cavities and Heat Sinks, and Methods of Packaging Same, to coinventor Negley, and U.S. Publication No. 2006/0124953, published Jun. 15, 2006, entitled Semiconductor Light Emitting Device Mounting Substrates and Packages Including Cavities and Cover Plates, and Methods Of Packaging Same, to coinventor Negley, both of which are assigned to the assignee of the present invention, the disclosures of both which are hereby incorporated herein by reference in their entirety as if set forth fully herein.

In particular, as described in the abstract of U.S. Publication No. 2006/0097385, published May 11, 2006, a mounting substrate for a semiconductor light emitting device includes a solid metal block having first and second opposing metal faces. The first metal face includes a cavity that is configured to mount at least one semiconductor light emitting device therein, and to reflect light that is emitted by at least one semiconductor light emitting device that is mounted therein away from the cavity. The second metal face includes heat sink fins therein. One or more semiconductor light emitting devices are mounted in the cavity. Reflective coatings, conductive traces, insulating layers, pedestals, through holes, lenses, flexible films, optical elements, phosphor, integrated circuits and/or optical coupling media also may be provided in the package. Related packaging methods also may be provided.

Moreover, as described in the abstract of U.S. Publication No. 2006/0124953, published Jun. 15, 2006, a mounting substrate for a semiconductor light emitting device includes a solid metal block having first and second opposing metal faces. The first metal face includes a cavity that is configured to mount at least one semiconductor light emitting device therein, and to reflect light that is emitted by at least one semiconductor light emitting device that is mounted therein away from the cavity. One or more semiconductor light emitting devices are mounted in the cavity. A cap having an aperture is configured to matingly attach to the solid metal block adjacent the first metal face such that the aperture is aligned to the cavity. Reflective coatings, conductive traces, insulating layers, pedestals, through holes, lenses, flexible films, optical elements, phosphor, integrated circuits, optical coupling media, recesses and/or meniscus control regions also may be provided in the package. Related packaging methods also may be provided.

Still referring to FIG. 5, the planar array 120 of LED devices 130 may be configured to act as the back face of a flat panel display 600 according to various embodiments of the present invention. More particularly, the display 600 of FIG. 5 includes a front face 570a that comprises the planar array 110 of LCD devices. A back face 570b comprises the at least one solid metal block 500 including the first and second opposing metal faces 500a, 500b, respectively, that extend parallel to the array 110 of LCD devices. The first metal face 500a is facing toward the array 110 of LCD devices, and the second metal face 120b is facing away from the array 110 of LCD devices. The first metal face 500a includes therein an array of reflective cavities 510, and the second metal face 500b includes therein a plurality of heat sink fins 530 that are exposed at the back face 570b of the flat panel display 600. At least one LED device 130 is mounted in a respective reflector cavity 510 such that, in operation, the reflector cavity 510 reflects light that is emitted by the at least one LED device 130 that is mounted therein away from the reflector cavity 510. Accordingly, the at least one solid metal block 500 forms an exposed back face of the flat panel display 100. An electronics module 550 also may be included that is electrically connected to the LED devices 130 and the LCD devices 110. A frame 540 and/or other mechanical elements may be used to maintain the array of LCD devices 110 and the array 120 of LED devices 130 in closely spaced apart relation facing one another. The electronics module 550 also may be supported by the frame 540.

Figure 6:
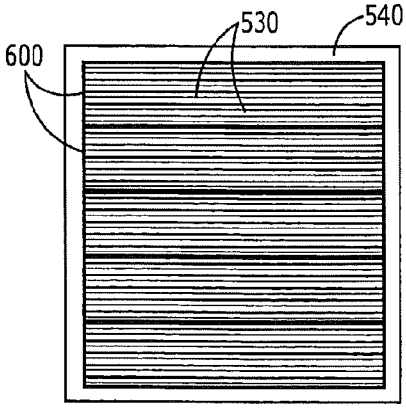
FIGS. 6 and 7 are plan views of flat panel displays of FIG. 5 according to still other embodiments of the present invention.
Figure 7:
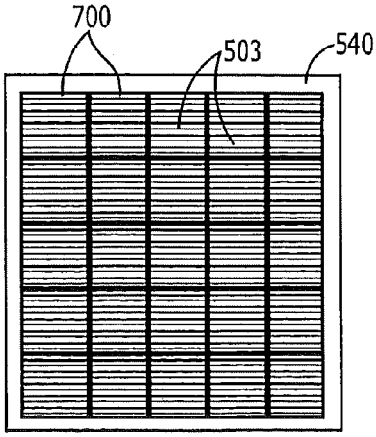

Various configurations of solid metal blocks 500 may be used according to various embodiments of the present invention. For example, as shown in FIG. 5, the solid metal block 500 may be a single solid metal block that is congruent to the planar array of LCD devices 110. In other embodiments, as shown in FIG. 6, a plurality of solid metal block bars 600 are arranged [face-to-face,] to be congruent to the planar array 110 of LCD devices. In still other embodiments, as shown in FIG. 7, a plurality of solid metal block tiles 700 are arranged in an array that is congruent to the planar array 110 of LCD devices. The solid metal block bars 600 and/or tiles 700 may be maintained in place by the frame 540 and/or by various interconnection schemes, including mating surfaces and/or fasteners on the bars and/or tiles that can provide mechanical and/or electrical interconnection of the LED devices 130 on the various bars 600 and/or tiles 700.

Figure 8:
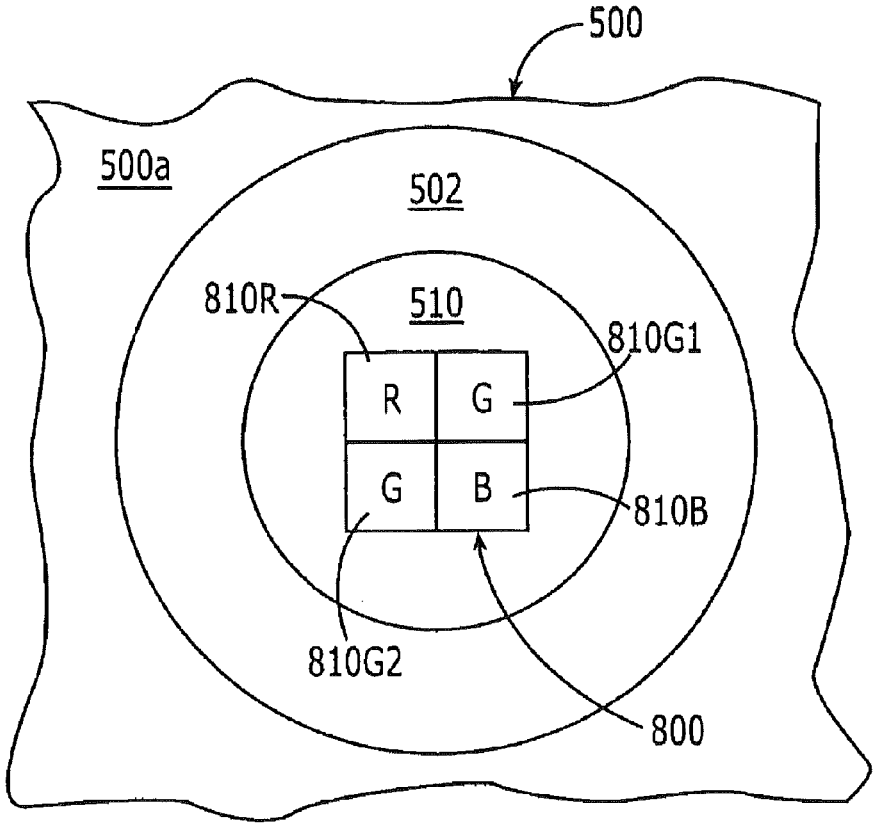
FIG. 8 is a plan view of a portion of a first face of a solid metal block of an array of LED devices according to various embodiments of the present invention.

FIG. 8 is a plan view of a portion of the first face 500a of a solid metal block 500 according to various embodiments of the present invention, illustrating how multiple LEDs may be placed in a single cavity according to various embodiments of the present invention. In particular, as shown in FIG. 8, a semiconductor white light pixel 800 includes a red LED device 810R, a blue LED device 810B, a first green LED device 810G1 and a second green LED device 810G2. The first and second green LED devices 810G1 and 810G2, respectively, emit light at different green frequencies. For example, in some embodiments, the first green LED device 810G1 can emit at 534 nm and the second green LED device 810G2 can emit at 528 nm. The red LED device 810R can emit at 625 nm and the blue LED device 810B can emit at 460 nm. The red, blue, first green and second green LED devices 810R, 810B, 810G1, 810G2, respectively, are configured to emit light that appears as a pixel of white light in operation.

In other embodiments, a single red, green and blue LED device may be configured to emit light that appears as a pixel of white light in operation. For example, in some embodiments, the die size of the red, green and/or blue LED devices may be selected to meet a desired brightness and/or intensity balancing. In one embodiment, standard LEDs marketed by the assignee of the present invention may be used wherein, for example, a C460XT290-Sxx00-A blue LED (290 μm×290 μm), a green C527XB500-S0100-A LED and a conventional red LED may be used. The larger green LED die can provide sufficient optical brightness and may reduce assembly costs compared to a pixel that includes, red, blue, first green and second green LED devices. Other configurations may be used to provide a desired lumen requirements using properly sized die.

Figure 9:
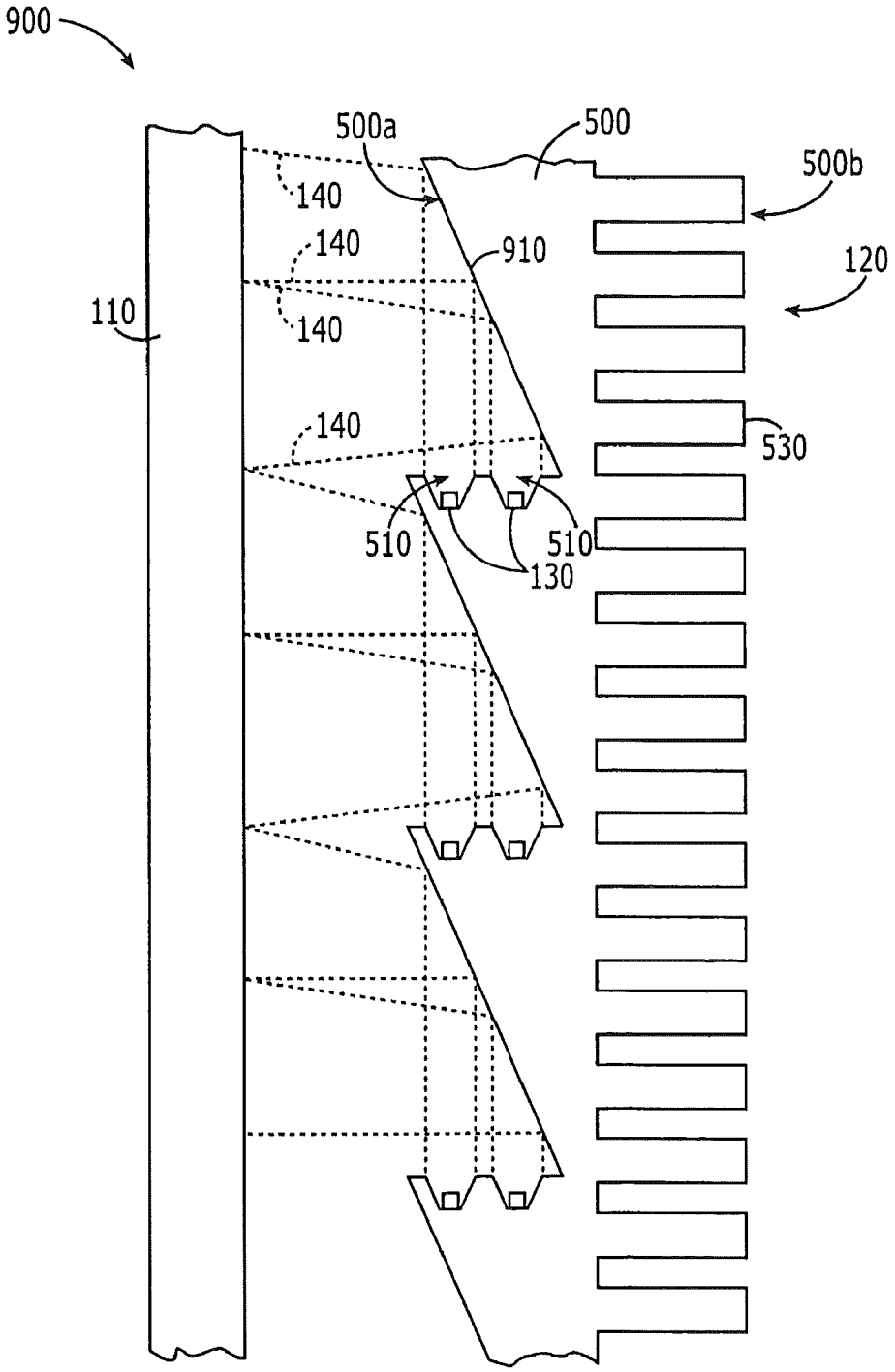
FIG. 9 is a cross-sectional view of display panels for flat panel displays according to various other embodiments of the present invention.

FIG. 9 is a cross-sectional view of display panels for flat panel displays according to other embodiments of the present invention. As shown in FIG. 9, these display panels 900 according to other embodiments of the present invention include at least one solid metal block 500 including first and second opposing faces 500a, 500b, respectively, that extend generally parallel to the array 110 of LCD devices. The first metal face 500a includes therein an array of reflector cavities 510 and the second metal face 500b includes therein a plurality of heat sink fins 530. At least one LED device 130 is mounted in a respective reflector cavity 510 such that, in operation, the reflector cavity 510 reflects light that is emitted by the at least one LED device 130 that is mounted therein from the reflector cavity along an optical path 140, as shown in FIG. 9.

In embodiments of FIG. 9, the planar array of LED devices 130 is configured to emit light generally parallel to the planar array of LCD devices 110. Moreover, an array of reflectors 910 also is provided. The reflectors 910 are generally oblique with respect to the first space 500a, and are configured to redirect the light that is emitted generally parallel to the planar array of LCD devices 110 along the light path 140 that extends generally perpendicular to the planar arrays of LCD and LED devices. Accordingly, some geometries according to embodiments of the present invention can provide optical cavities that are generally perpendicular or oblique to the first face 500a and can use a secondary optical reflector 910 to move the photons from generally parallel to the first face 500a to generally orthogonal to the first face 500a. In some embodiments, a flexible film including optical elements may extend parallel to the arrays of LCD and LED devices, similar to the flexible film 560 of FIG. 5. In other embodiments, separate flexible films may be provided across the cavities 510, extending generally orthogonal to the arrays of LCD and LED devices.

It also will be understood by those having skill in the art that various combinations and subcombinations of embodiments of FIGS. 1-9 may be provided according to other embodiments of the present invention. Thus, for example, embodiments of FIG. 9 may be combined with embodiments of FIGS. 5, 6, 7 and/or 8.

In the drawings and specification, there have been disclosed embodiments of the invention and, although specific terms are employed, they are used in a generic and descriptive sense only and not for purposes of limitation, the scope of the invention being set forth in the following claims.

What is claimed is:

[1. A display panel for a flat panel display comprising:

a front face comprising a planar array of liquid crystal display (LCD) devices; and a back face comprising at least one solid metal block including first and second opposing metal faces that extend parallel to the array of LCD devices, wherein the first metal face is facing toward the array of LCD devices and the second metal face is facing away from the array of LCD devices, the first metal face including therein an array of reflector cavities and the second metal face including therein a plurality of heat sink fins that are exposed at the back face of the flat panel display; and at least one LED device mounted in a respective reflector cavity such that, in operation, the reflector cavity reflects light that is emitted by the at least one LED device that is mounted therein away from the reflector cavity;

wherein the at least one solid metal block comprises a plurality of solid metal block tiles that are arranged in an array that is congruent to the planar array of LCD devices.]

[2. A display panel according to claim 1 in combination with a frame that is configured to surround the front and back faces of the display panel.]

[3. A display panel according to claim 2 in further combination with an electronics module that is supported by the frame and that is configured to control the array of LCD devices and the at least one LED device.]

[4. A display panel according to claim 1 wherein the planar array of LCD devices is at least 17 inches in size along a diagonal thereof.]

[5. A display panel according to claim 1 wherein the at least one LED device is configured to emit light that appears as white light.]

[6. A display panel according to claim 5 wherein the at least one LED device that is mounted in a respective reflector cavity and that is configured to emit light that appears as white light consists of:

a red LED device;

a blue LED device; and two green LED devices.]

[7. A display panel according to claim 6 wherein the two green LED devices emit green light at different frequencies.]

[8. A display panel according to claim 1 further comprising:

a planar optical film that is located between the planar array of LCD devices and the at least one LED device such that, in operation, the at least one LED device transmits light through the planar optical film and to the planar array of LCD devices.]

[9. A display panel according to claim 1 in combination with other electrical and/or mechanical elements to provide a computer monitor and/or a television.]

[10. A display panel for a flat panel display comprising:

a front face comprising a planar array of liquid crystal display (LCD) devices; and a back face comprising at least one solid metal block including first and second opposing metal faces that extend parallel to the array of LCD devices, wherein the first metal face is facing toward the array of LCD devices and the second metal face is facing away from the array of LCD devices, the first metal face including therein an array of reflector cavities and the second metal face including therein a plurality of heat sink fins that are exposed at the back face of the flat panel display; and at least one LED device mounted in a respective reflector cavity such that, in operation, the reflector cavity reflects light that is emitted by the at least one LED device that is mounted therein away from the reflector cavity;

wherein the at least one solid metal block comprises a plurality of solid metal block bars that are arranged face-to-face to be congruent to the planar array of LCD devices.]

[11. A display panel according to claim 10 in combination with a frame that is configured to surround the front and back faces of the display panel.]

[12. A display panel according to claim 11 in further combination with an electronics module that is supported by the frame and that is configured to control the array of LCD devices and the at least one LED device.]

[13. A display panel according to claim 10 wherein the planar array of LCD devices is at least 17 inches in size along a diagonal thereof.]

[14. A display panel according to claim 10 wherein the at least one LED device is configured to emit light that appears as white light.]

[15. A display panel according to claim 14 wherein the at least one LED device that is mounted in a respective reflector cavity and that is configured to emit light that appears as white light consists of:

a red LED device;

a blue LED device; and two green LED devices.]

[16. A display panel according to claim 15 wherein the two green LED devices emit green light at different frequencies.]

[17. A display panel according to claim 10 further comprising:

a planar optical film that is located between the planar array of LCD devices and the at least one LED device such that, in operation, the at least one LED device transmits light through the planar optical film and to the planar array of LCD devices.]

[18. A display panel according to claim 10 in combination with other electrical and/or mechanical elements to provide a computer monitor and/or a television.]

[19. A display panel for a flat panel display comprising:

a front face comprising a planar array of liquid crystal display (LCD) devices; and a back face comprising at least one solid metal block including first and second opposing metal faces that extend parallel to the array of LCD devices, wherein the first metal face is facing toward the array of LCD devices and the second metal face is facing away from the array of LCD devices, the second metal face including therein a plurality of heat sink fins that are exposed at the back face of the flat panel display; and a plurality of LED devices mounted on the first metal face;

wherein the at least one solid metal block comprises a plurality of solid metal block tiles that are arranged in an array that is congruent to the planar array of LCD devices.]

[20. A display panel according to claim 19 in combination with a frame that is configured to surround the front and back faces of the display panel.]

[21. A display panel according to claim 20 in further combination with an electronics module that is supported by the frame and that is configured to control the array of LCD devices and the at least one LED device.]

[22. A display panel according to claim 19 wherein the planar array of LCD devices is at least 17 inches in size along a diagonal thereof.]

[23. A display panel according to claim 19 wherein the at least one LED device is configured to emit light that appears as white light.]

[24. A display panel according to claim 23 wherein the at least one LED device that is mounted in a respective reflector cavity and that is configured to emit light that appears as white light consists of:

a red LED device;

a blue LED device; and two green LED devices.]

[25. A display panel according to claim 24 wherein the two green LED devices emit green light at different frequencies.]

[26. A display panel according to claim 19 further comprising:

a planar optical film that is located between the planar array of LCD devices and the at least one LED device such that, in operation, the at least one LED device transmits light through the planar optical film and to the planar array of LCD devices.]

[27. A display panel according to claim 19 in combination with other electrical and/or mechanical elements to provide a computer monitor and/or a television.]

[28. A display panel for a flat panel display comprising:

a front face comprising a planar array of liquid crystal display (LCD) devices; and a back face comprising at least one solid metal block including first and second opposing metal faces that extend parallel to the array of LCD devices, wherein the first metal face is facing toward the array of LCD devices and the second metal face is facing away from the array of LCD devices, the second metal face including therein a plurality of heat sink fins that are exposed at the back face of the flat panel display; and a plurality of LED devices mounted on the first metal face;

wherein the at least one solid metal block comprises a plurality of solid metal block bars that are arranged face-to-face to be congruent to the planar array of LCD devices.]

[29. A display panel according to claim 28 in combination with a frame that is configured to surround the front and back faces of the display panel.]

[30. A display panel according to claim 29 in further combination with an electronics module that is supported by the frame and that is configured to control the array of LCD devices and the at least one LED device.]

[31. A display panel according to claim 28 wherein the planar array of LCD devices is at least 17 inches in size along a diagonal thereof.]

[32. A display panel according to claim 28 wherein the at least one LED device is configured to emit light that appears as white light.]

[33. A display panel according to claim 32 wherein the at least one LED device that is mounted in a respective reflector cavity and that is configured to emit light that appears as white light consists of:

a red LED device;

a blue LED device; and two green LED devices.]

[34. A display panel according to claim 33 wherein the two green LED devices emit green light at different frequencies.]

[35. A display panel according to claim 28 further comprising:

a planar optical film that is located between the planar array of LCD devices and the at least one LED device such that, in operation, the at least one LED device transmits light through the planar optical film and to the planar array of LCD devices.]

[36. A display panel according to claim 28 in combination with other electrical and/or mechanical elements to provide a computer monitor and/or a television.]

*37. A flat panel comprising:*

*a plurality of solid metal block tiles, a respective one of which includes first and second opposing faces and four ends therebetween, the plurality of solid metal block tiles*

*being connected end-to-end in the flat panel, the plurality of solid metal block tiles including mating surfaces therebetween; and*

*a plurality of light emitting diodes (LEDs), a respective one of which is mounted on the first face of a respective solid metal block tile in the flat panel.*

*38. A flat panel according to claim 37 wherein the plurality of solid metal block tiles are connected end-to-end in the flat panel in a two-dimensional array of solid metal block tiles.*

*39. A flat panel according to claim 37 in combination with a flat panel frame that is configured to surround the plurality of solid metal block tiles.*

*40. A flat panel according to claim 39 in further combination with a flat panel electronics module that is supported by the flat panel frame and that is configured to control the at least one of the LEDs.*

*41. A flat panel according to claim 37 wherein the plurality of solid metal block tiles that are connected end-to-end in the flat panel is at least 17 inches in size along a diagonal thereof.*

*42. A flat panel according to claim 37 wherein at least one of the LEDs is configured to emit light that appears as white light.*

*43. A flat panel according to claim 37 wherein a respective first face of a respective solid metal block tile includes a respective reflective cavity therein, and wherein the respective one of the LEDs is mounted in the respective reflective cavity.*

*44. A flat panel according to claim 37 in further combination with other electrical and/or mechanical elements of the flat panel.*

*45. A flat panel according to claim 37 wherein the second face includes therein a plurality of metal heat sink fins.*

*46. A flat panel comprising:*

*a plurality of solid metal block bars, a respective one of which includes first and second opposing faces and four ends therebetween, the plurality of solid metal block bars being connected end-to-end in the flat panel, the plurality of solid metal block bars including mating surfaces therebetween; and*

*a plurality of light emitting diodes (LEDs), a respective one of which is mounted on the first face of a respective solid metal block bar in the flat panel.*

*47. A flat panel according to claim 46 wherein the plurality of solid metal block bars are connected end-to-end in the flat panel in a one-dimensional array of bars.*

*48. A flat panel according to claim 46 in combination with a flat panel frame that is configured to surround the plurality of solid metal block bars.*

*49. A flat panel according to claim 48 in further combination with a flat panel electronics module that is supported by the flat panel frame and that is configured to control the at least one of the LEDs.*

*50. A flat panel according to claim 46 wherein the plurality of solid metal block bars that are connected end-to-end in the flat panel is at least 17 inches in size along a diagonal thereof.*

*51. A flat panel according to claim 46 wherein at least one of the LEDs is configured to emit light that appears as white light.*

*52. A flat panel according to claim 46 wherein a respective first face of a respective solid metal block bar includes a respective reflective cavity therein, and wherein the respective one of the LEDs is mounted in the respective reflective cavity.*

*53. A flat panel according to claim 46 in further combination with other electrical and/or mechanical elements of the flat panel.*

*54. A flat panel according to claim 46 wherein the second face includes therein a plurality of metal heat sink fins.*

* * * * *